United States Patent
Billman et al.

(10) Patent No.: US 12,174,030 B1
(45) Date of Patent: Dec. 24, 2024

(54) LOCAL FLIGHT PATH NAVIGATION FOR DRONE DELIVERIES

(71) Applicant: UIPCO, LLC, San Antonio, TX (US)

(72) Inventors: Bradly Jay Billman, Celina, TX (US); Sacha Melquiades De'Angeli, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 58 days.

(21) Appl. No.: 17/513,373

(22) Filed: Oct. 28, 2021

(51) Int. Cl.
| | | |
|---|---|---|
| *G01C 21/34* | (2006.01) | |
| *B64C 39/02* | (2023.01) | |
| *B64U 10/13* | (2023.01) | |
| *B64U 101/60* | (2023.01) | |
| *G05D 1/00* | (2024.01) | |

(52) U.S. Cl.
CPC ........ *G01C 21/3476* (2013.01); *B64C 39/024* (2013.01); *G05D 1/101* (2013.01); *B64U 10/13* (2023.01); *B64U 2101/60* (2023.01)

(58) Field of Classification Search
CPC .. G01C 21/3476; B64C 39/024; G05D 1/101; B64U 10/13; B64U 2101/60
See application file for complete search history.

(56) References Cited

U.S. PATENT DOCUMENTS

| | | | | |
|---|---|---|---|---|
| 10,692,038 | B2* | 6/2020 | Stuckman | G06Q 10/0832 |
| 10,775,792 | B2* | 9/2020 | Cooper | G01C 21/20 |
| 10,839,336 | B2* | 11/2020 | Greiner | B64D 1/02 |
| 11,393,346 | B1* | 7/2022 | Ogun | H04W 4/70 |
| 2017/0337826 | A1* | 11/2017 | Moran | G08G 5/006 |
| 2018/0244404 | A1* | 8/2018 | Park | G06Q 10/0836 |
| 2019/0130342 | A1* | 5/2019 | Maheshwari | H04W 4/70 |
| 2021/0045564 | A1* | 2/2021 | Duckers | E05D 15/264 |

FOREIGN PATENT DOCUMENTS

JP 2022113184 A * 8/2022

OTHER PUBLICATIONS

Machine Translation JP 2022113184 (Year: 2022).*

* cited by examiner

*Primary Examiner* — Anne Marie Antonucci
*Assistant Examiner* — Wesam Almadhrhi
(74) *Attorney, Agent, or Firm* — Plumsea Law Group, LLC

(57) ABSTRACT

A system and method for high-precision automated guidance of a drone via a local (on-site) computing device for delivery of items is disclosed. The drone navigates to a location in proximity to the recipient's home using standard navigation protocols. Once the UAV arrives at this local destination, communication between the UAV and an on-site computing device occurs. The on-site device serves as a micro air-traffic controller to the UAV's precise drop off target location. The on-site device can provide approach vectors, guidance around obstacles and navigation instructions to a final micro-destination.

20 Claims, 13 Drawing Sheets

LOCAL FLIGHT PATH NAVIGATION FOR DRONE DELIVERIES

TECHNICAL FIELD

The present disclosure generally relates to navigation control techniques, and in particular to a system and method for more precisely guiding an unmanned aerial vehicle (UAV) to a specific target on a property site once the UAV is in proximity of the site.

BACKGROUND

Drones, or unmanned aerial vehicles (UAVs), show high potential for parcel delivery. Drone delivery may be faster, less expensive, and more eco-friendly than traditional delivery modes such as trucks. Although drones are not yet in regular commercial use, many companies have initiated pilot tests, with the expectation that the mechanism will become common in the future.

However, existing approaches either focus on rural areas or rely on centralized drop-off locations from where the last mile delivery is performed. Conventional drone delivery systems are designed for delivery of a package to a farm or an estate, with no other house in sight. In reality, a growing number of people in the world live in dense urban areas, and in apartments or condominiums. According to World Bank data, urban living is the norm already today, and its share is growing steadily. The urban "last mile problem" is a barrier to wider use of drone delivery systems. For example, in a multi-story house environment, the issue does not end with finding the right building—as a next step the drone needs to find the right apartment. Then, the drone must drop the packet at the right location, usually a balcony with limited space for maneuvering. While doing all this, the drone needs to circumnavigate any obstructions. Current drone navigation is ill-equipped to perform these tasks.

There is a need in the art for a system and method that addresses the shortcomings discussed above.

SUMMARY

In one aspect, a method of guiding an unmanned aerial vehicle (UAV) to a micro-destination for high-precision delivery of items is disclosed. A first step includes causing, via an onboard computing device, the UAV to travel to a first position near a first property, the first position being in range of signals generated from a first computing device installed on the first property. A second step includes receiving, from a first computing device and at the onboard computing system, a first navigation signal that is configured to provide directions from the first position to a first micro-destination corresponding to a specific portion of the first property. In addition, a third step includes causing, via the onboard computing system and in response to receiving the first navigation signal, the UAV to travel a first path based on the directions, and a fourth step includes determining, at the onboard computing system, that the UAV has arrived at the first micro-destination. Furthermore, a fifth step includes causing, via the onboard computing system, an item carried by the UAV to be released at the first micro-destination.

In another aspect, a method of guiding an unmanned aerial vehicle (UAV) to a micro-destination for high-precision delivery of items is disclosed. The method includes a first step of receiving, at a first computing device installed at a first property, coordinates for a first micro-destination and a second step of receiving, at the first computing device, identification data for a UAV located at a first position in proximity to the first computing device. A third step includes verifying, at the first computing device and with reference to a delivery knowledge repository, the UAV as corresponding to a first expected delivery. In addition, a fourth step includes generating, via a signal emitter of the first computing device, a navigation signal configured to direct the UAV from the first position to the first micro-destination, and a fifth step includes updating the delivery knowledge repository to indicate arrival of the UAV for the first expected delivery.

In another aspect, a system for guiding an unmanned aerial vehicle (UAV) to a micro-destination for high-precision delivery of items includes a processor and machine-readable media including instructions which, when executed by the processor, cause the processor to cause, via an onboard computing device of the UAV, the UAV to travel to a first position near a first property, the first position being in range of signals generated from a first computing device installed on the first property, and to receive, from a first computing device and at the onboard computing system, a first navigation signal that is configured to provide directions from the first position to a first micro-destination corresponding to a specific portion of the first property. The instructions further cause the processor to cause, via the onboard computing system and in response to receiving the first navigation signal, the UAV to travel a first path based on the directions, and to determine, at the onboard computing system, that the UAV has arrived at the first micro-destination. The instructions also cause the processor to cause, via the onboard computing system, an item carried by the UAV to be released at the first micro-destination.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

Figure 1:
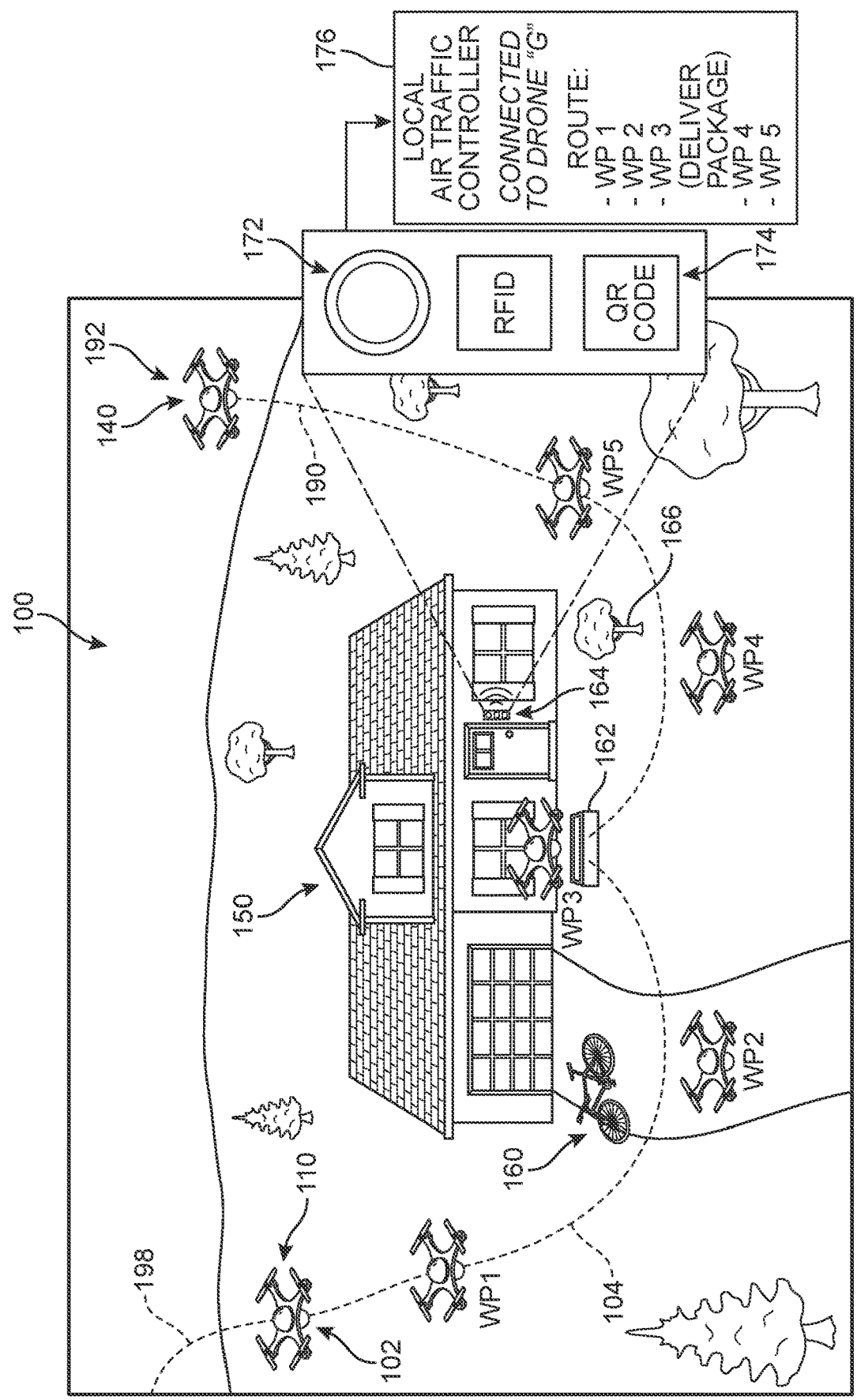
FIG. 1 is a depiction of an embodiment of a local navigation system associated with an on-site navigation computing device, the system being employed by an unmanned aerial vehicle (UAV) during a delivery to a house, according to an embodiment.

Despite the simultaneously growing popularity of both unmanned aerial vehicles (UAVs) and online shopping with home delivery, the issue of the "last mile" remains an obstacle to widespread implementation of a drone delivery service. Although it is believed that autonomous vehicles will deliver 80 percent of parcels in the future, there is a general belief that an autonomous drone delivery model is only viable in rural areas. The proposed embodiments describe a system and method for drone delivery that integrates with local on-site computing devices ("navigation devices") to provide the drone with localization, navigation, and coordination data outside of rural areas. The proposed systems are configured to enable autonomous drone delivery in dense urban environments, such as neighborhoods and with buildings equipped with a small private area for landing such as a balcony or a porch. The proposed embodiments are designed to substantially expand the delivery range for drones and offer increased precision with respect to landing zones.

In different embodiments, the UAV would initially autonomously navigate to a location in proximity to the recipient's home using GPS-based navigation, which is typically accurate as long as the vehicle remains above roof-level of the nearby structures. Once the UAV arrives at this local destination, communication between the UAV and an on-site computing device occurs. The on-site device serves as a micro air-traffic controller to the UAV's precise drop off target location (referred to herein as a drop site). In different embodiments, the on-site device (referred to herein as a local navigation controller, or a controller device) can provide approach vectors, guidance around obstacles (such as tall hedges near the front door), optical and laser guidance, and/or transmitted navigation instructions. These instructions can be learned by the drone to approach the drop site and also to back out by using the same path in reverse. Thus, the UAV 'switches' to this local device-based navigation in order to make its final approach to the target, and switches back to its macro-navigation systems once the delivery is complete.

As one example, an apartment-dweller of a multi-story building may have a controller navigation device stationed near their balcony. The UAV can approach the area around the building and initiate a secure communication with the controller navigation device, which issues precise instructions to the UAV regarding navigation from its current location to the drop site, which is in this case, the balcony. The UAV enters the airspace above the balcony, drops off the package, and leaves on the same path it arrived. Such a process avoids the computationally intensive task of visual odometry for the UAV, where computer vision would be required to navigate, and the higher likelihood of error.

In some embodiments, the system can also select or assign micro-delivery locations based on the size, weight and type of delivered product. For example, drones can be instructed to place very heavy products near the garage door of a house, or small high-value products, like jewelry, on the back deck of the same house. In addition, although aerial unmanned vehicles are discussed, the proposed embodiments can also be employed for ground-based unmanned vehicles using the same techniques. For human deliveries, the system can direct delivery personnel to place packages at a particular location around the structure.

For purposes of clarity, an overview of one embodiment of the proposed systems and methods is illustrated with reference to FIGS. 1, 2A, and 2B. In FIG. 1, an example of an implementation of the proposed system is shown as executed via the onboard computing device of a UAV 102 working in concert with a first navigation computing device ("first device") 164 installed on a structure for a property 100, such as a house 150. The first device 164 includes input and output components that provide signal receiving and transmitting capability. As used herein, the term "building" or "structure" can refer to any kind of building, such as a home, or other residential building, apartment complex, a shed, barn, a commercial building or any other related structures. A building typically can include a roof, room, walls, support structures, windows, or other features. In some cases, a primary structure situated on the property 100 can be associated with additional secondary structures, features, landscaping, or other real property that may be disposed adjacent to or otherwise near the primary structure. In different embodiments, the UAV 102 is configured to navigate to the general area near the house 150, which represents a macro-destination. For purposes of this discussion, a macro-destination refers to the larger target destination that can be reached without reference to instructions from an on-site computing device. In some embodiments, the UAV 102 approaches a first proximate position 102 close to the house 150, where a "proximate position" refers to a position such that the first device 164 associated with the macro-destination is able to be in communication or sight range of an imaging or sensor component and/or communication module of the UAV 102.

It can be appreciated in FIG. 1 that direct paths leading to a target micro-destination (i.e., the precise spot on the property 100 or house 150 where the delivery drop off is to occur, such as the front door, back door, garage, etc.) may be obstructed by various structural features or items present on property 100. For example, a bicycle 160 has been left on the driveway of the house 150, and multiple shrubbery 166 surround the house 150. Once the UAV 102 approaches and arrives at the first proximate position 110 via, for example, GPS-based navigation, it can initiate communication with the first device 164 before beginning its 'final approach' to the micro-destination. As shown in FIG. 1, the onboard computing system for UAV 102 has received and is executing a pre-programmed first route 198 that directs the UAV 102 to particular spatial locations (e.g., geospatial coordinates) near the residence 150. In some embodiments, the micro-destination is identified in real-time by the first device 164 (e.g., the first device 164 has been programmed to determine where to direct the UAV 102 based on various parameters such as time of day, occupancy status, value of the delivery, size of the package, etc.), while in other embodiments, the micro-destination has been pre-programmed in the onboard computing device for the UAV 102 based on delivery parameters and/or recipient preferences.

In this example, the UAV 102 is requested to make the drop at a first micro-destination 162, here shown as a dropbox located outside a front-facing window of the house 150. The first device 164 issues directions 176 to the UAV 102 to travel a first path 104 (depicted in dashed line) that guides the UAV 102 to a first micro-waypoint (WP1), then to a second micro-waypoint (WP2) (avoiding the bicycle 160), and a third micro-waypoint (WP3) directly adjacent to the first micro-destination 162, and finally, directly above the dropbox, where the instructions trigger a release of the package into the dropbox. In some embodiments, the UAV 102 can reverse the sequence of micro-waypoints to conduct its departure. In another embodiment, shown in FIG. 1, the first device 164 can provide additional directions 176 to conduct the UAV 102 to travel a second path 190 to a new microlocation 192 where it can resume travel without reference to first device 164 for example via a fourth micro-waypoint (WP4) (avoiding the shrubbery 166) and a fifth micro-waypoint (WP5). For purposes of this application, a waypoint is a specified geographical location used to define an area navigation route or the flight path of a UAV employing area navigation. Furthermore, a micro-waypoint refers to a specific position around or in proximity to a larger geographical location (i.e., property 100 or house 150) that can represent the macro-waypoint ("waypoint").

The proposed device can include provisions for establishing communication or transmitting information to a potential drone. In different embodiments, the communication between the UAV 102 and first device 164 is enabled via a light or RF-based signaling module 174 emitted from the first device 164. FIGS. 2A and 2B present an embodiment of these techniques for purposes of illustration. In both cases, the first device 164 are mounted by a front door 260 of the house 150 of FIG. 1. In different embodiments, the first device 164 can be configured as a standalone navigation device that can be obtained for the primary purpose of directing UAVs to the correct micro-destination. However, in other embodiments, the first device 164 is incorporated into an existing smart device, such as a smart doorbell (e.g., Ring®, Nest®, Wyze®, etc.).

Figure 2A:
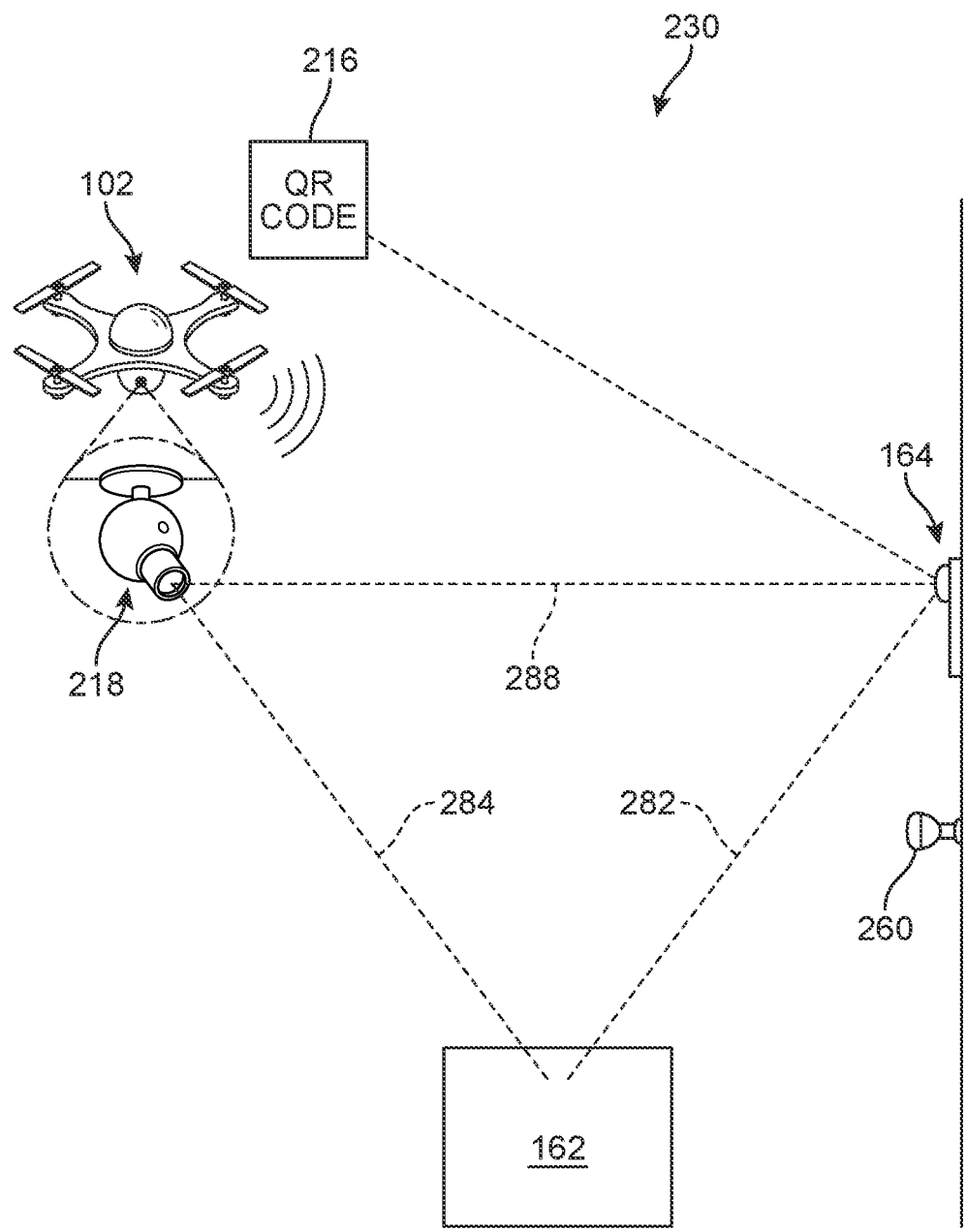
FIGS. 2A and 2B are schematic views of navigation signals emitted by a local computing device for use by a UAV, according to an embodiment.

An example of light-based signaling is shown in FIG. 2A, where the first device 164 transmits a light (e.g., laser, IR, etc.) to guide the UAV 102. A first light-based signal 282 is transmitted to the target area around the dropbox (micro-destination 162), "marking" the landing spot for the UAV 102 to zone in on. In some embodiments, a camera 218 on the UAV 102 picks up the light signal location and uses optical detection and distance from the point of light contact on the target area to navigate to the location of delivery. The UAV 102 can then release its package at the micro-location 162. In an alternative embodiment, a second light-based signal 288 is emitted from the first device 164, which camera 218 picks up. The UAV 102 then maintains the light beam in the camera lens location, for example using optical image processing and tracking, to keep the beam of light in the lens view. The UAV 102 follows this beam of light, detecting distance from the emitting first device 164 until the proper distance and/or position is reached. The UAV 102 then hovers or lands at the micro-location 162 coordinates and drops package. In addition, in some embodiments, the UAV 102 can transmit its identity via any output components (speaker, broadcast signal, display, etc.). in different embodiments, the identity data may comprise the name of delivery service or merchant (e.g., UPS®, FedEx®, Amazon®, USPS®, USAA®, etc.), or even the model of the specific drone (e.g., PrimeAir® Model "A", etc.). In one embodiment, the data may be transmitted via a code 216, to the mounted transmitting and receiving first device 164 to indicate who it represents.

Figure 2B:
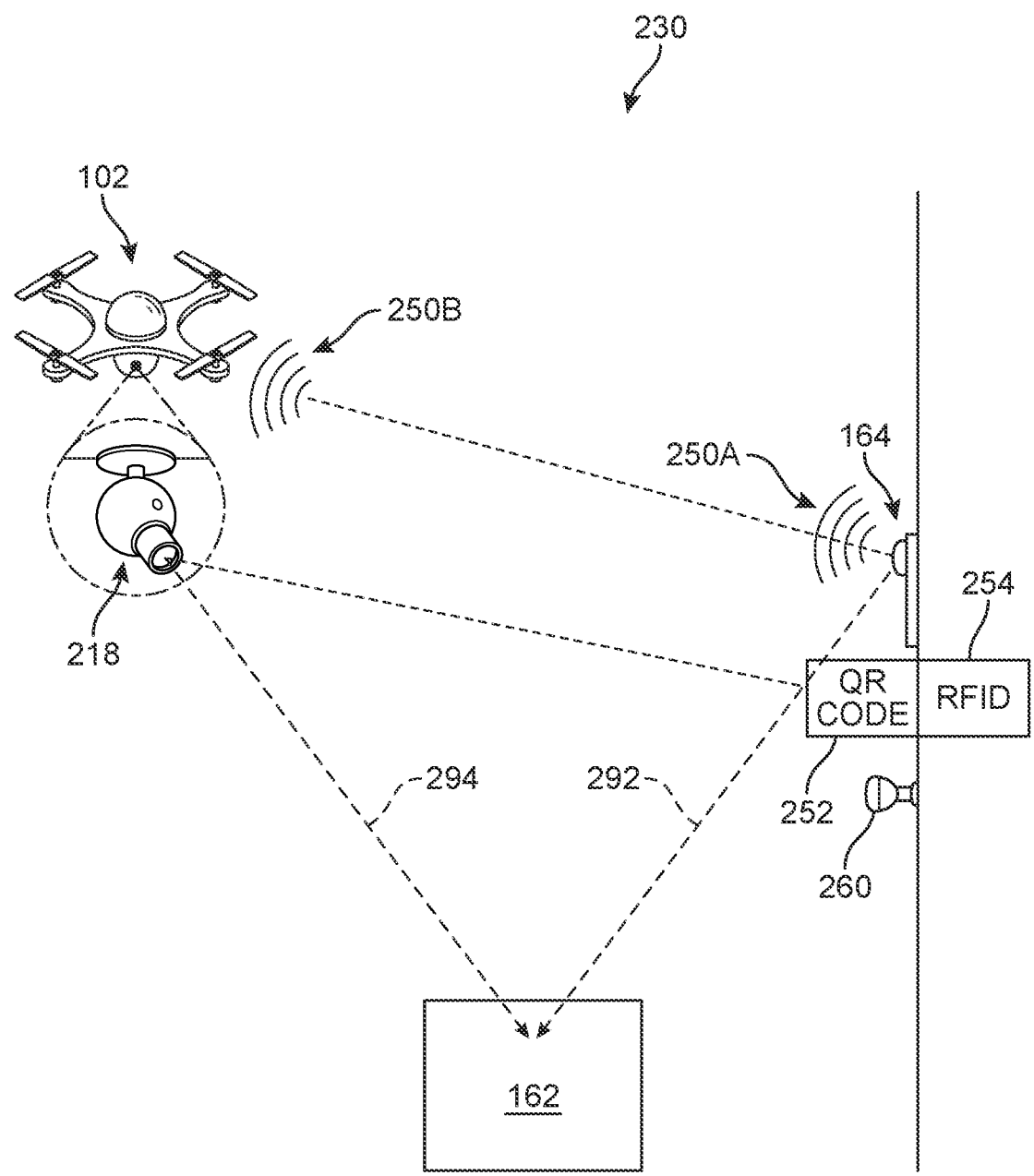

An example of RF-based signaling is shown in FIG. 2B, where the first device 164 transmits an RF signal 250a to guide the UAV 102, received as RF signal 250b. In different embodiments, the RF signal 250 is transmitted continuously or in response to a detection of an object approaching. The UAV 102 detects the distance from the first device 164 location to the UAV 102 and aligns itself (up/down, left/right) with the signal. The UAV 102 positions itself based on the RF signal 250b until it is in place over the desired drop area (micro-destination 162). The UAV 102 then lands or hovers at the micro-location 162 coordinates and drops package. In addition, in some embodiments, the UAV 102 can transmit its identity via any output components (speaker, broadcast signal, display, etc.). in different embodiments, the identity data may comprise the name of delivery service or merchant (e.g., UPS®, FedEx®, Amazon®, USPS®, USAA®, etc.), or even the model of the specific drone (e.g., PrimeAir® Model "A", etc.) that is transmitted to the mounted transmitting and receiving first device 164 to indicate who it represents.

In another alternate embodiment, the UAV camera 218 detects a QR code 252 that provides directions and a point of reference to zero in on to deliver the package to the micro-destination 162. In some embodiments, this approach can be favored when the first device 164 is low on power and unable to emit the light or RF signal, or the micro-destination is located out of signal range of the first device 164. In one embodiment, the camera 218 'sees' the QR code 252 and interprets the message to drop at a certain distance and height or as a reference point that the UAV 102 calculates from. In some embodiments, the QR code 252 provides the navigation instructions with a plurality of waypoints that can direct the UAV 102 to the nearby drop off location. In yet another alternate embodiment, an RFID circuit that produces an RFID tag 260 is present in the first device 164 that the UAV 102 can detect. The UAV 102 transmits a signal that powers the RFID tag 260, which then transmits back information to create a point of reference to zero in on for landing and distance from the micro-destination 162. The RFID signal is especially useful in cases where line-of-sight is not possible between the UAV and the local computing device with respect to the selected micro-destination (e.g., a device that is mounted on a front door but instructs the UAV to perform the delivery at the back door).

Figure 3:
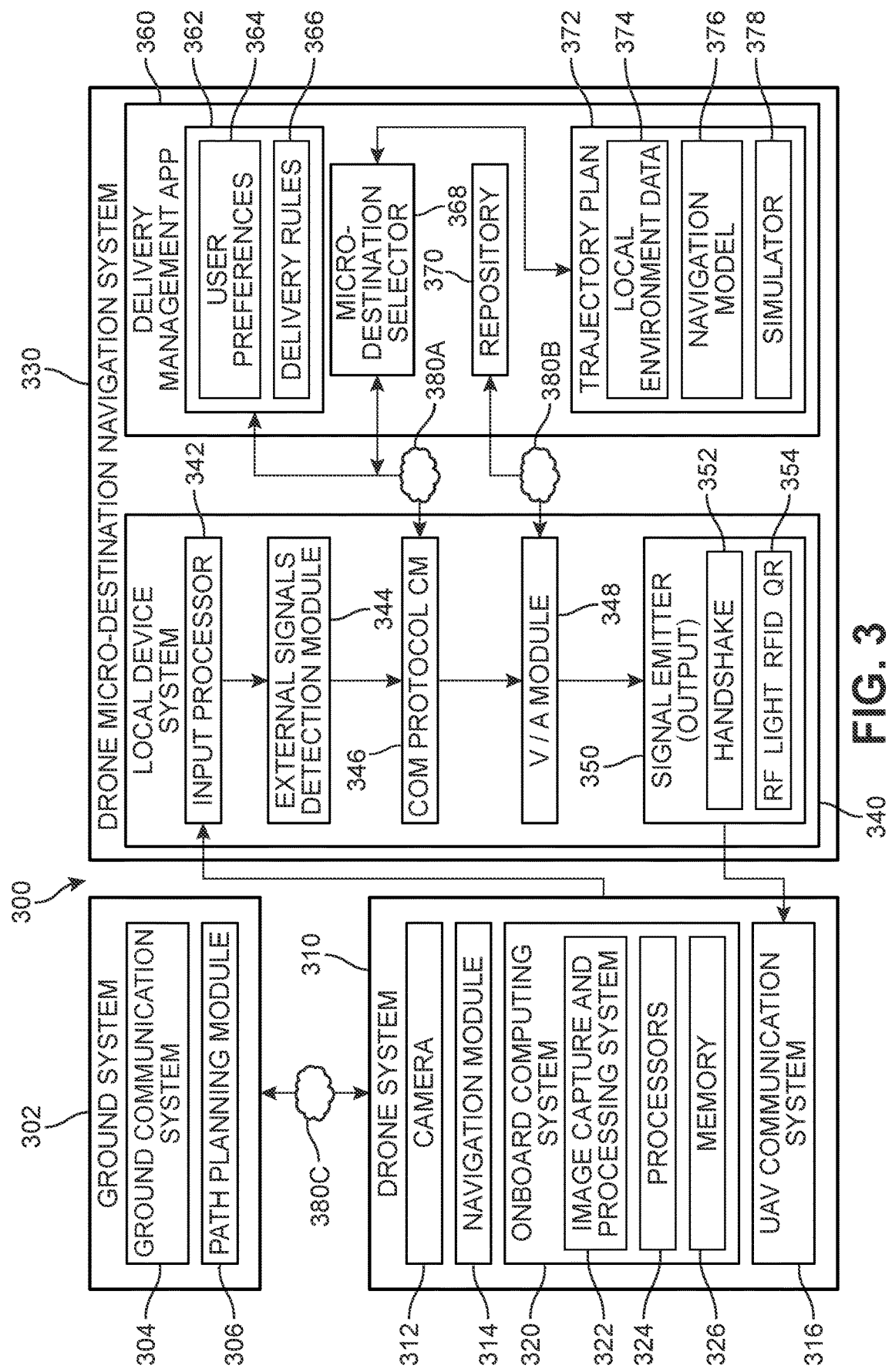
FIG. 3 is a schematic view of a framework for guiding a UAV to a micro-destination on a property via a local navigation computing device installed on the property, according to an embodiment.

Referring now to FIG. 3, a schematic diagram of an environment in which an embodiment of a framework 330 for providing local guidance to UAVs is depicted. In different embodiments, some of the steps may be performed by local (recipient) computing system(s), some by remote cloud-based servers (e.g., in conjunction with a delivery management app 360 over networks 380a, 380b, and 380c), and some of the steps may be performed by aerial system(s). FIG. 3 depicts environment 300 that is further comprised of a ground system 302 and an aerial drone system ("drone") 310. The ground system 302 includes provisions for gathering information about upcoming or pending deliveries following an order request that can be used to facilitate the drone's flight through upper airspace. For purposes of this application, upper airspace refers to the navigable airspace through which a drone may travel using GIS or GPS navigation until reaching its macro-destination. Upper airspace is typically controlled. The term lower airspace, as used in this application, refers to the airspace that must be traversed in order to move to the final micro-destination (after reaching the micro-destination). Thus, in lower space, the drone will rely on navigation data received from the local computing device to enable safe passage around target sites that can include multiple obstacles.

In different embodiments, the ground system 302 comprises a computing system with one or more processors and memory. The ground system 302 includes provisions for communicating with various other systems (e.g., a ground communication system 304) as well as for processing image or other data received from UAVs. The ground system 302 can also include a path planning module 306 that works in conjunction with a navigation module 314 of the drone 310. The path planning module 306 includes provisions for generating upper airspace flight path directions.

The drone 310 may comprise various systems and components that are disposed within an aerial vehicle (such as the UAV 102 in FIG. 1). Drone 310 may include a camera 312 for capturing images and other light-based data. Camera 312 may comprise any kind of camera, including any kind of digital camera, as well as a camera configured to capture infrared, x-ray, ultraviolet, and visible light signals. Drone system 304 can also include navigation module 314 that can further include a GPS receiver for receiving GPS information that can be used to determine a GPS location for the aerial vehicle. In addition, the navigation module 314 can receive path instructions from ground system 302 and process and execute the instructions to direct the UAV along the pre-designated path.

Drone 310 may also include sensors for measuring orientation, altitude, and/or acceleration. For example, drone 310 can include a gyroscope, an altimeter, and an accelerometer. In some embodiments, drone 310 can include an altitude and heading reference system (AHRS). Using these devices, the orientation, heading, and height of the aerial vehicle (and of camera 312) can be determined. This information, when used with a GPS location for the aerial vehicle, can be used to infer the location of the drone and its position relative to a target destination.

Drone 310 can also include an onboard computing system 320 that can work in conjunction with the other components of drone 310, including navigation module 314. In one example, navigation module 314 is incorporated in the onboard computing system 320. The onboard computing system 320 further includes an image capture and processing system 322, also referred to simply as processing system 322. Processing system 322 may be used to store, process, and transmit image information. Additionally, in some cases, processing system 322 can receive navigation other coordinate/micro-waypoint information about one or more target locations. To facilitate these tasks, image capture and processing system 322 may include one or more processors 324 as well as memory 326. Memory 326 can store instructions for programs that facilitate storing, processing, and transmitting image information. The processed image data can be provided to navigation module 314 to execute a path through lower airspace.

Drone 310 can include a UAV communication system 316 for communication with the ground communication system 302 and local navigation device system(s) ("device") 340. These communication components enable information to be transmitted between the systems via a network or signal processing. Thus, the type of communication components used in each communication system can be selected according to the type of communication channel used. In some cases, a cellular network could be used so that each communication system includes a cellular radio or other component that enables cellular communication. Using a cellular network may enable information to be exchanged while drone 310 is in the air where Wi-Fi or other networks might be unavailable. In other cases, networks could comprise any kind of local area network and/or wide area network. In some cases, network may be a Wi-Fi network. In some embodiments, ground system 302 and drone 310 are connected by network 380c. In different embodiments, one or more components of drone 310 could be disposed within a single computing device.

In different embodiments, the framework 330 from which local navigation instructions are generated includes a local device 340 and a delivery management app 360 that are in regular communication via networks 380a and 380b. in some embodiments, the local device 340 refers to a computing device such as a laptop, desktop, tablet, mobile device, or other computer that is configured to provide navigation instructions to a UAV. In different embodiments, the local navigation computing device can refer to one or more of a stationary internet of things (IoT) device(s) ("smart devices"). Smart devices could comprise any of a variety of different IoT devices, such as one or more of a smart doorbell, smart camera, smart security system, smart lighting system, and other smart devices that may include one or more emitters or output components that can be used for guiding drones.

Each device 340 may include one or more processors and memory. Memory may comprise a non-transitory computer readable medium. Instructions stored within memory may be executed by the one or more processors. In addition, each device may include a communication system such as a radio or other provisions for communicating using one or more communication methods. In particular, communication system includes provisions for communicating with other nearby devices and/or cloud server over a network. For example, each communication system could include a Wi-Fi radio, a Bluetooth radio, other NFC components, and/or a cellular network radio. Each local computing device can include provisions for communicating with, and processing information from, a cloud-based server as well as other devices in the home network. In some embodiments, the delivery management app 360 is configured to provide controls for an end-user to adjust the operation of the local device 340 and its interactions with any drones.

In different embodiments, the app 360 is a cloud-based service or locally installed program that includes or has access to a trajectory planning module 372 ("trajectory plan") configured to generate local aerial routes or instructions for the drones. In one example, the trajectory planning module 372 calculates a collision free trajectory based on the current position of the drone, the desired trajectory endpoint and the images and information provided regarding the property. For example, in some embodiments, the trajectory planning module 372 may include any program or algorithm that is used to determine a route to one or more specified target locations that takes into account one or more location-specific factors ("local environment data") 374 associated with the target property and micro-destinations, such as but not limited to data provided by local IoT devices stationed around the property, a three-dimensional model of the recipient's property or structure (provided by the recipient using app 360). In some embodiments, trajectory planning module 372 includes one or more machine learning models, herein referred to as navigation model 376. In one embodiment, navigation model 376 could include a convolutional neural network. In other embodiments, navigation model 376 could comprise any other algorithm (or set of algorithms) from the field for machine learning and/or machine vision.

In different embodiments, the algorithms can be implemented as software running on a processor, DSP processor, special purpose ASIC and/or FGPA's. The algorithms can also be a mixture of custom developed algorithms and libraries. The algorithms can further be arranged in any logical sequence, with potential changes in the sequence of processing or parameters governing the processing determined by image type, path requirements, computational requirements, or outputs from other algorithms.

As a general matter, the trajectory planning module 372 is configured, given an area of interest ("target location" or "target environment"), to plan and generate a path which covers the salient features of the target environment considering the micro-destination selected, image capture restrictions and/or environmental conditions associated with the target location, the specific type of UAV that arrives (e.g., the UAV's motion restrictions and sensor's characteristics), as well as obstacles that may be present on the way to the micro-destination. In an aerial context, the obstacles can represent no-flight zones (NFZ) that the UAV must give wide berth.

In different embodiments, the target local environment (e.g., house, condominiums, apartment building, etc.) is usually split into non-intersecting regions called cells using a decomposition technique. The size and resolution of the cells may change according to the type of decomposition and a specific strategy should be applied in order to guarantee the complete coverage. These cells typically are proportional to the camera's range, representing only one point in the projected path. In aerial coverage, the UAVs fly at a certain altitude from the ground carrying a camera as a sensor to perform the task. In this case, the size of the cells is proportional to the footprint of the camera in the UAV, and the grid resolution is obtained through the image requirements, such as resolution and overlapping rates, and the image sensor characteristics. The UAV coverage path is composed of a set of waypoints, where each waypoint represents a navigation command to the vehicle, such as take-off, change of speed or move to a specific location, and contains information about the latitude, longitude and altitude. In one embodiment, the flight paths are typically followed by implementing guidance systems such as discrete sets of waypoints that are usually generated on a remote ground station and then wirelessly relayed to the UAV's autopilot. For purposes of this application, a macro-waypoint is a specified geographical location used to define an area navigation route or the flight path of a UAV employing area navigation through upper airspace, and a micro-waypoint is a specified geographical location used to define an area navigation route or flight path of a UAV through lower airspace based in part on navigation information received from a local computing device.

These (macro and micro) waypoints have all the necessary localization information to guide the vehicle and the cells are proportional to the footprint of the camera. More specifically, a waypoint at a minimum refers to data that includes a set of coordinates that identify a specific point in physical space. A ground system equipped with waypoint technology typically utilizes Global Positioning System (GPS) and Global Navigation Satellite System (GLONASS) to create waypoints. As long as the UAV is able to connect with at least four GPS or GLONASS, precise three-dimensional positioning (longitude, latitude, altitude) can be determined. Thus, waypoints can be used to describe the flight path. In some embodiments, a waypoint may further include instructions for the flight path between two sets of coordinates and the maneuvers that should be performed by the UAV between each set of coordinates. Furthermore, the position of the waypoint also determines the arrival time accuracy.

In different embodiments, the trajectory planning module 372 of app 360 implements one or more path coverage algorithms that generate coverage paths according to the application requirements. For instance, a main goal of a delivery is to ensure a safe and undamaged handover. In some embodiments, the trajectory planning module 372 reviews knowledge or information about the target environment and can virtually re-construct a full map in order to determine which path represents the most effective and efficient execution of the delivery mission according to the predefined performance objectives 362, including user preferences 364 and delivery rules 366. User preferences 364 can include one or more options selected by the user with respect to the deliveries, such as basing the selection of a micro-destination automatically for a drone based on (a) drone type, (b) package/item type, (c) package/item size, (d) time of delivery, (e) whether anyone is 'home', (f) weather conditions, etc. Delivery rules 366 refer to pre-defined rules for the flights that can serve as default settings. In some embodiments, the delivery rules 366 override the user preferences 364 in cases where the safety of the drone, package, or residents may be at risk if the user preferences 364 were to be applied.

In some embodiments, micro-destinations can be selected or otherwise identified by the end-user, or can be automatically defined based on data received about the target location. The trajectory planning module 372 determines the most efficient path leading to the micro-destination based on multiple location-specific factors while avoiding obstacles. For example, the navigation model 376 can compute the path using a sequence of points that should be visited in order to minimize the total distance while adjusting the path to accommodate the environmental and structural considerations for the location. After visiting the micro-destination a single time, the drone can reverse the navigation to return to the initial macro-destination in upper airspace before departing the area.

Thus, based on local image data and/or sensor data from other IoT devices (local environment data 374) around the property an aerial route may be automatically generated via navigation model 376. In some embodiments, the navigation model 376 can present multiple prospective flight paths to a specific micro-destination from the given macro-destination via simulator 378 for the end-user to review and approve. In some embodiments, each target destination can be associated or linked with a pre-designated macro-destination which is known in advance by the drone and device 340. In some embodiments, more than one structure can share the same macro-destination (e.g., see FIG. 9).

In different embodiments, a user can select a micro-destination via a micro-destination selection module ("micro-destination selector") 368 available via app 360 from a plurality of micro-destinations that have been previously uploaded (e.g., see FIG. 6) or registered during the identification of various target drop off sites around the property via trajectory planning module 372. If there is a single micro-destination, this will be the default target that the drone 310 will be directed toward based on the path generated by navigation model 376, linked to the micro-destination, and shared with the device 340. If there are multiple micro-destinations, the predefined performance objectives 362 will be used to determine which micro-destination should be selected. In another example, the user can manually select the micro-destination for one or more individual drone deliveries via app 360, for example after submission of an order or after receiving a notification that a delivery will occur that day. While in some embodiments the device 340 is configured to continuously produce a navigation signal that includes information for navigation to the micro-destination, such that a communication protocol control module ("Com Protocol CM") 346 emits an output via signal emitter 350 without a pre-condition or other trigger, in other embodiments the device 340 will only release the instructions following detection of a drone in order to conserve energy. In one embodiment, an external signals detection module 344 for device 340 determines whether the input received indicates a likelihood of a drone's arrival at the nearby designated macro-destination for that property. For example, in different embodiments, as drone 310 approaches device 340, various input signals are received by an input processor 342, such as radio communications, image data, network data, or other information, based on the drone's appearance and components as well as the device's input components (e.g., camera, broadcast receiver, light sensor, microphone, infrared LED, motion sensor, NFC devices, etc.).

In still another embodiment, the device 340 will only release the instructions following approval by a verification and authentication module ("V/A module" or "verification module") 348. In one embodiment, the verification module 348 can cause the signal emitter 350 to generate a handshake signal 352 in response to detection of a drone, where the handshake signal 352 requests a connection between the two systems to initiate an authentication with a request for identification data from the drone 310. In another embodiment, the verification module 348 can obtain passive data from the input processor 342 to determine an identity of the drone 310. Thus, in some embodiments, the specific ambient sound a particular drone model produces can be used to determine the presence of a drone (i.e., each model produces a slightly different ambient sound), while in another embodiment, the drone may include a speaker and produce a particular audio that triggers recognition by the device 340. In another embodiment, the drone can include tags or stickers with codes that, when captured by a camera of the device 340, can be used to identify the drone 310. In still other embodiments, the drone can produce various light output that can signal the arrival of the drone to the device 340. In some embodiments, the verification module 348 can be in communication with a scheduled deliveries knowledge repository ("repository") 370 that can be maintained by the recipient as they submit delivery orders. In some cases, the merchant or other provider of the delivery can submit the processed orders (or cancelled orders) to the recipient's repository such that the schedule is automatically updated. In another example, if external persons such as friends or family wish to send items to the recipient, they or the merchant from whom they make the order can send data to the recipient's repository 370 to ensure 'unexpected' deliveries are also accommodated. In another embodiment, the recipient can assign specific a micro-destination for each scheduled delivery that will be stored in the repository. The assigned micro-destination will be accessed from the repository 370 by the device 340 when the delivery arrives to determine which guidance to present to the drone. In some embodiments, the device 340 is configured to communicate with/update the repository 370 to indicate an arrival of the UAV that corresponds to a scheduled delivery and notify the recipient of the delivery.

As discussed above with reference to FIGS. 2A and 2B, in different embodiments, the signal emitter 350 can produce a light-based or RF-based signal that guides the drone 310 to the micro-destination. In different embodiments, in cases where the signal emitter 350 includes a display, the output can comprise a QR code that, when scanned by the drone 310, provides the drone 310 to access a specific set of directions to the target micro-destination. In another example, the device 340 may simply include a permanent QR code printed or otherwise passively displayed on the surface of the device 340 that can be scanned by the drone 310. This can be of use particularly in situations where the micro-destination is outside the line of sight of the device 340. In another example, an active RFID with embedded GPS receivers that can provide a sequence of GPS location coordinates as part of their beacon payload that serves as directions to the micro-destination may be made accessible to the drone 310.

In different embodiments, navigation module 314 for the drone 310 is responsible to control the takeoff and landing modes of the drone. The navigation module 314 takes off the drone upon receiving the instructions from the service provider, for example via a cloud service platform. When the drone reaches the recipient's GPS macro-location, the navigation module 314 obtains instructions to navigate to the micro-destination where it lands and releases the parcel. In some embodiments, the drone 310 can then send a beacon message to the device 340 and/or recipient's other computing devices to confirm delivery.

Figure 4:
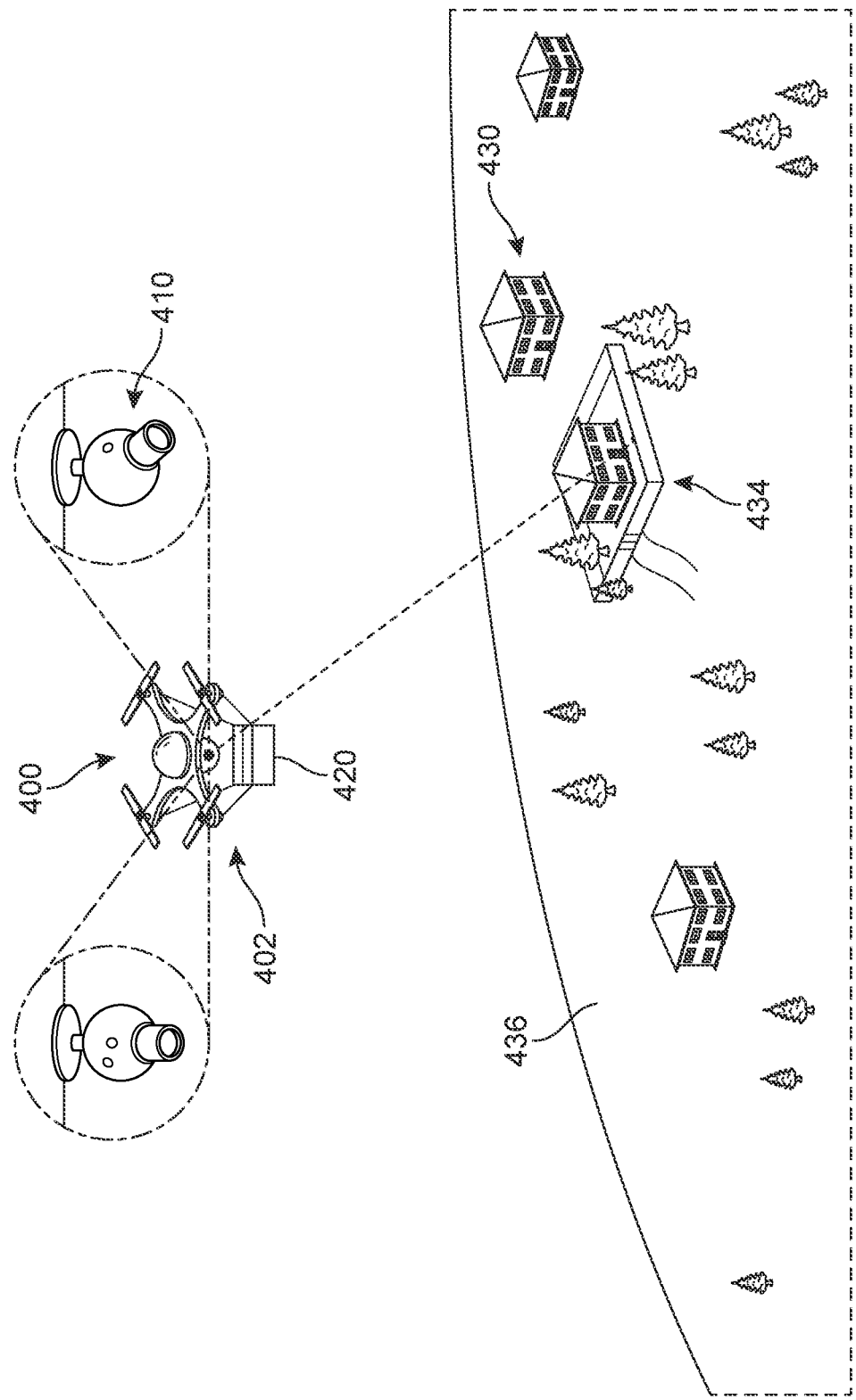
FIG. 4 is an example of a UAV approaching a neighborhood with houses including a navigation computing device, according to an embodiment.

Referring to FIGS. 4-7 another example of the proposed embodiments is presented. In FIG. 4, a drone 400 with cameras 410 carrying a package 420 is traveling to a property 436 that includes a residence 434 as well as a plurality of structures 430. The drone 400 is able to independently arrive at a macro-destination which in this case is proximate to the residence 434. At this time, the drone 400 will receive information from a local device associated with property 436 that will provide the final routing or directions leading to the target drop-off point.

Figure 5A:
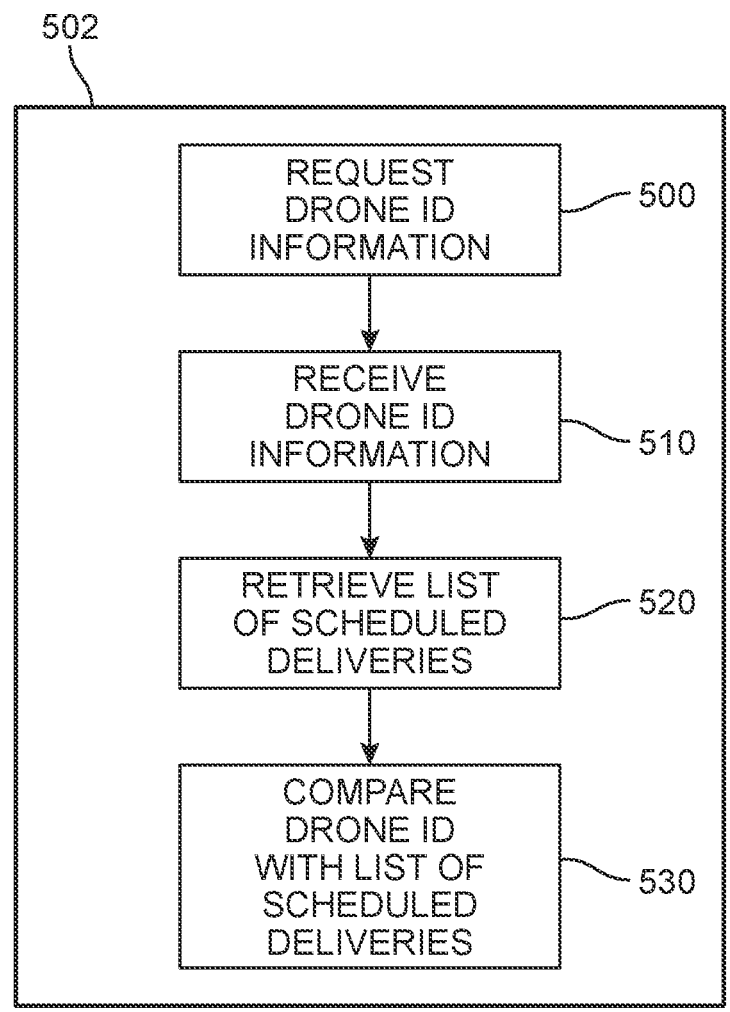
FIG. 5A is a flow chart presenting a communication sequence between a navigation computing device and a UAV, according to an embodiment.
Figure 5B:
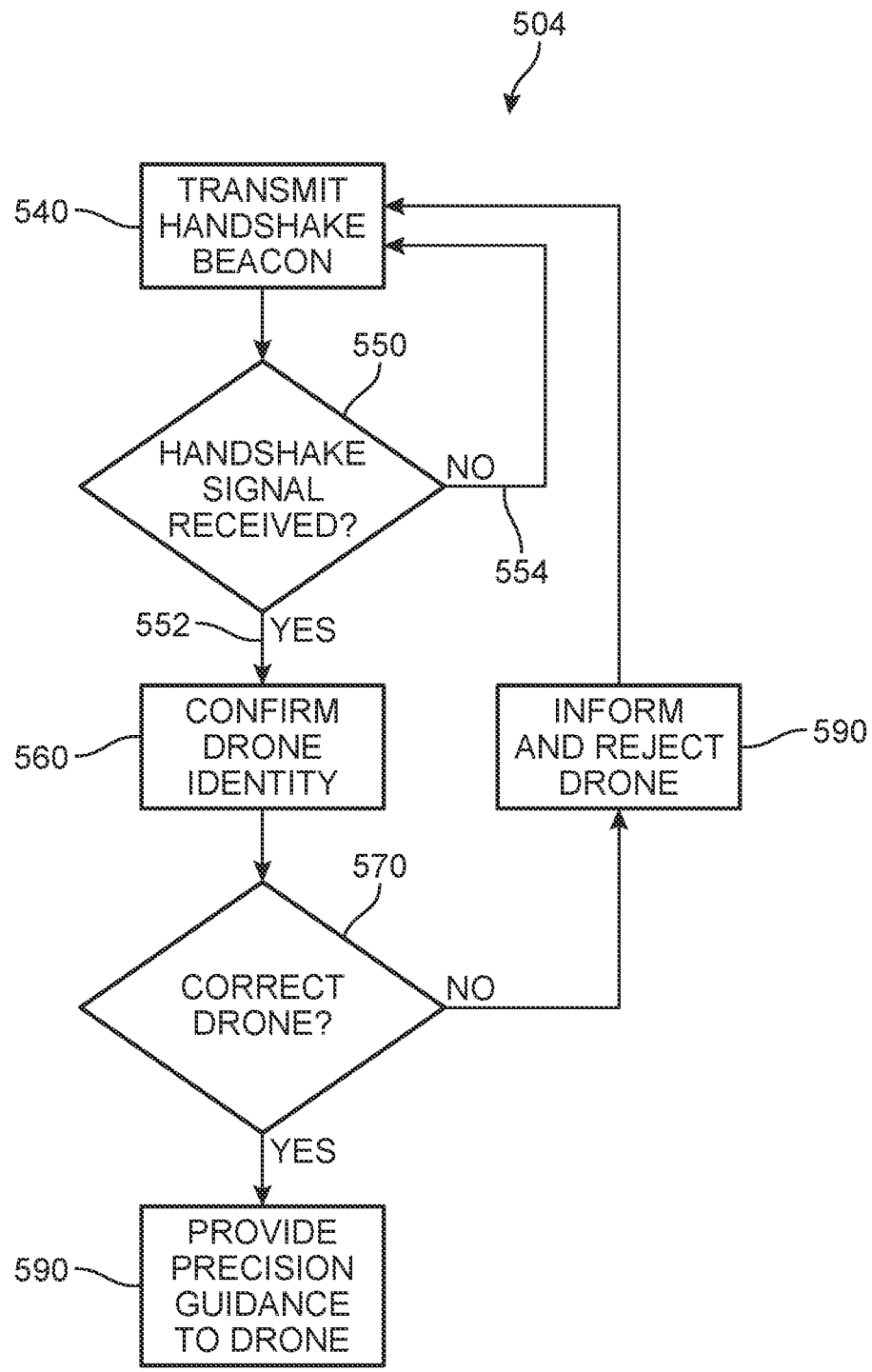
FIG. 5B is a flow diagram presenting a process of UAV identity verification, according to an embodiment.

In some optional embodiments, in order to provide additional security to the delivery process, the interaction between the drone 400 and the navigation device(s) for residence 434 can include a communication that is used to verify whether the approaching drone 400 is to be permitted to receive the final navigation instructions. In FIGS. 5A and 5B, two processes are presented in which verification and authentication are performed. A verification process 502 in shown in FIG. 5A. A first step 500 in which the local computing device or smart doorbell requests identification information from the drone. The requested information is received by the local device in a second step 510, and a list of scheduled deliveries retrieved in a third step 530. In a fourth step 530, the local device compares the drone identification with its list of scheduled of deliveries.

An example implementation of this process is shown in flow diagram 504 of FIG. 5B. In a first stage 540, the local device can transmit a handshake 'beacon' signal. If there is a nearby drone, the handshake signal 550 can be received from the drone at the local device in a second stage 550. If no drone is nearby, the local device continues transmitting the handshake signal in a third stage 554. In a fourth stage 560, the received handshake signal is used to confirm the drone's identity by the local device. If the drone is verified 570, the local device proceeds to provide precision guidance to the drone as described herein in a fifth stage 590. If the information received is insufficient for verification, the local device transmits a rejection message to the drone in a sixth stage 580.

Figure 6:
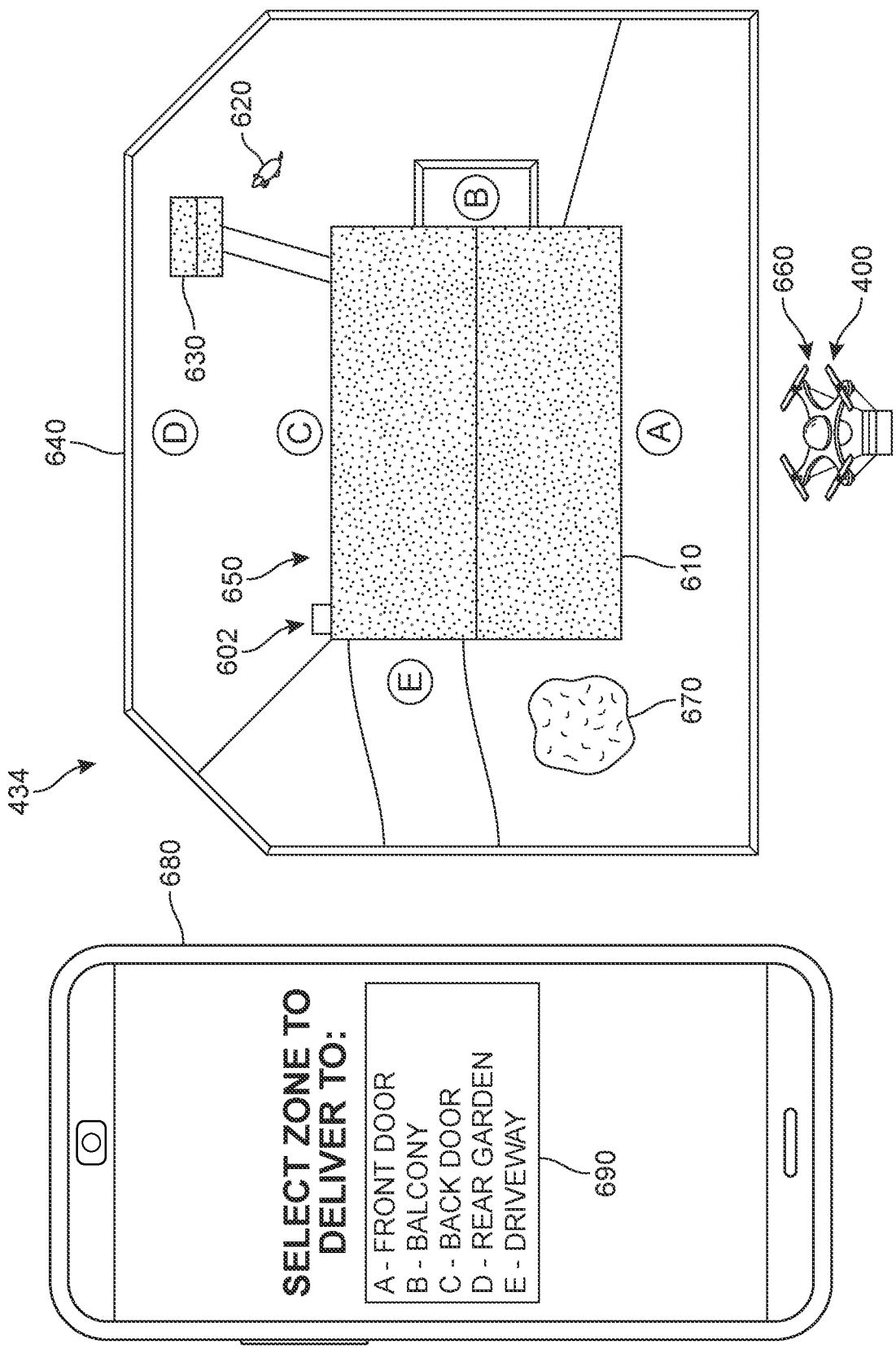
FIG. 6 is a top-down view of a house at which a navigation computing device is installed, according to an embodiment.

Referring now to FIG. 6, a top-down view of the residence 434 is shown, as drone 400 is positioned in macro-destination 660 near a roof 610 of the residence 434. In different embodiments, a local navigation device ("local device") 602, here mounted on a back side 650 of the residence 434, can be configured to receive instructions from a computing device—here shown as a mobile phone 680—associated with the recipient, for example via a precision delivery app 690. In this illustration, the recipient has programmed multiple potential delivery sites, here shown by letters A-E in FIG. 6. For example, A refers to the front door, B to the balcony on the side of the house, C to the back door, D to the rear garden, and E to the driveway. The property can be seen to also include a small structure (a doghouse 630) and a dog 620, as well as shrubs 670, with a fence 640 surrounding the residence 434. Thus, it can be appreciated that there are multiple obstructions to a safe landing for the drone 400. In different embodiments, the recipient can select the micro-destination via the app 690 at any time following the scheduling of the delivery up to the arrival of the drone 400. In other words, the local device 602 is configured to transmit different directions in response to selections made by the recipient.

Figure 7:
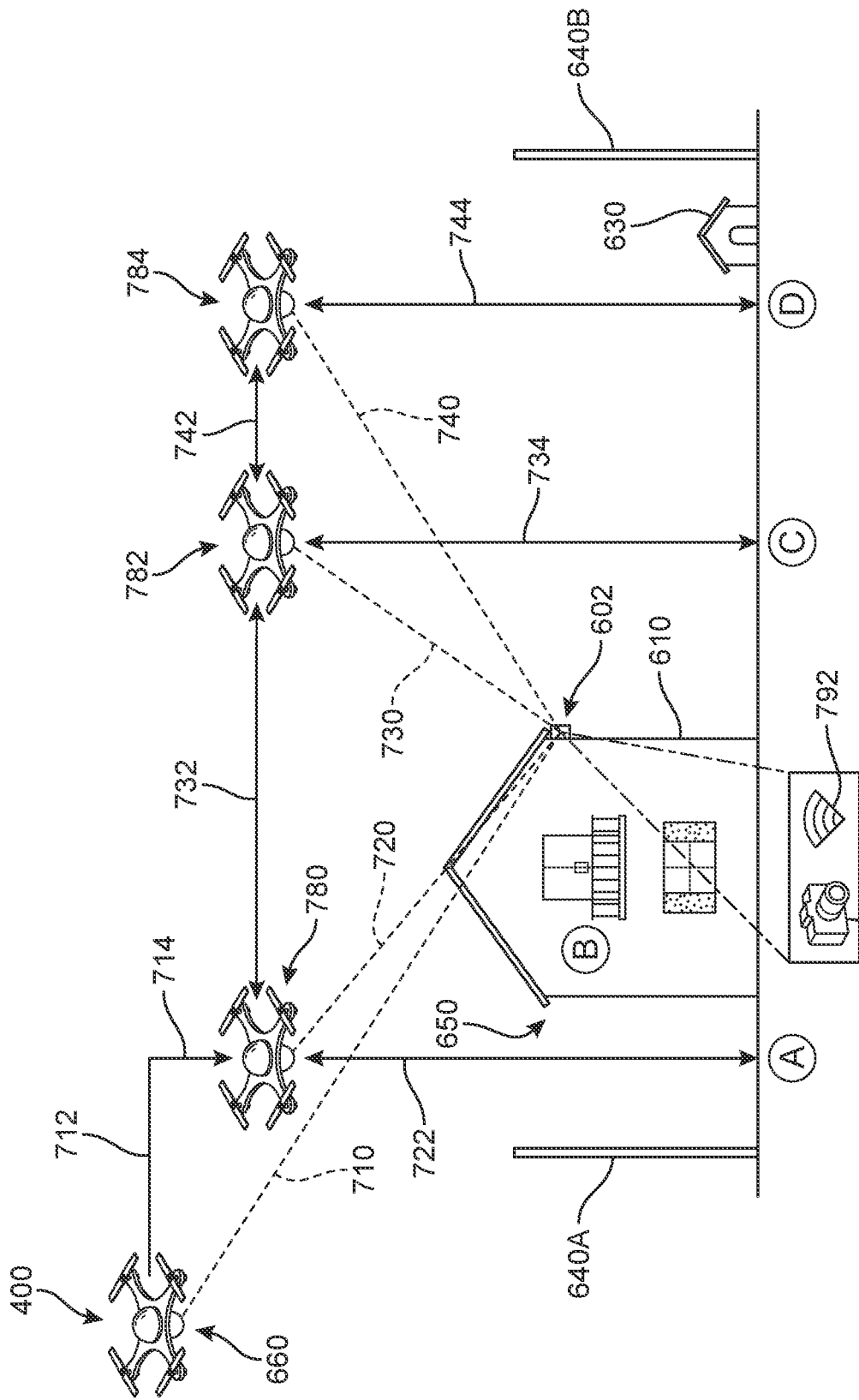
FIG. 7 is a side-view of a house with a schematic illustration of directions transmitted to the UAV for various micro-destinations, according to an embodiment.

An example of this type of dynamic micro-destination guidance is shown in FIG. 7. A schematic side view of the residence 650 is depicted, with fence portions 640a (toward front) and 640b (toward rear) shown on either side. The drone 400 is initially hovering in macro-destination 660, above and slightly offset from the residence 650. The local device 602 is stationed at the back of the residence 650, and can include a signaling module 792 and in some cases a camera 790. Once the handshake has been performed and the drone 400 verified, the local device 602 can emit one or more types of communication streams, depicted here as four dashed lines extending up and outward. It should be understood that FIG. 7 presents only one possible implementation of the proposed systems, and in other embodiments, other signaling events may be used.

Initially, a first signal 710 (e.g., light or RFID) transmitted from the local device 602 is received by the drone 400, which moves the drone 400 forward a first distance 712, and then down a second distance 714, to a first position 780. If the target delivery site corresponds to "A" (front door), the signal can instruct the drone to simply continue moving downward a third distance 622 until reaching the micro-destination. If the target delivery site corresponds to "C" (back door) or "D" (rear garden), a second signal 720 (which may be a continuation of the first signal 710, a separate signal, or a representation of a single data transmission that included all waypoint stages at the start) is received by the drone that instructs the vehicle to move further toward the back of the house by a fourth distance 732 until reaching a second position 782. If the selected delivery site is "C", a third signal 730 is received by the drone that instructs the vehicle to move downward a fifth distance 734 until reaching the micro-destination adjacent to the back door. If the selected delivery site is "D", the third signal 730 that is received by the drone instead instructs the vehicle to move further toward the back of the house by a sixth distance 742. A fourth signal 740 then instructs the drone to move downward a seventh distance 744 until reaching the "D" micro-destination in the rear garden.

It should be understood that the first, second, third, and fourth signals in FIG. 7 are depicted for reference only, and the signals may differ. For example, as discussed above, in some embodiments, the local device 602 may present a QR or other code, or an RFID tag, that provides the entire sequence of navigation from the macro-destination to the micro-destination. In other cases, the local device 602 can provide a light-based signal that can be used to create micro-waypoint beacons along the designated path until reaching the final target site, whether or not the micro-waypoints are in the line-of-sight (LOS) of the local device. Some examples of these types of LOS and non-line-of-sight (NLOS) mechanisms are now presented with respect to FIGS. 8, 9, and 10.

Figure 8:
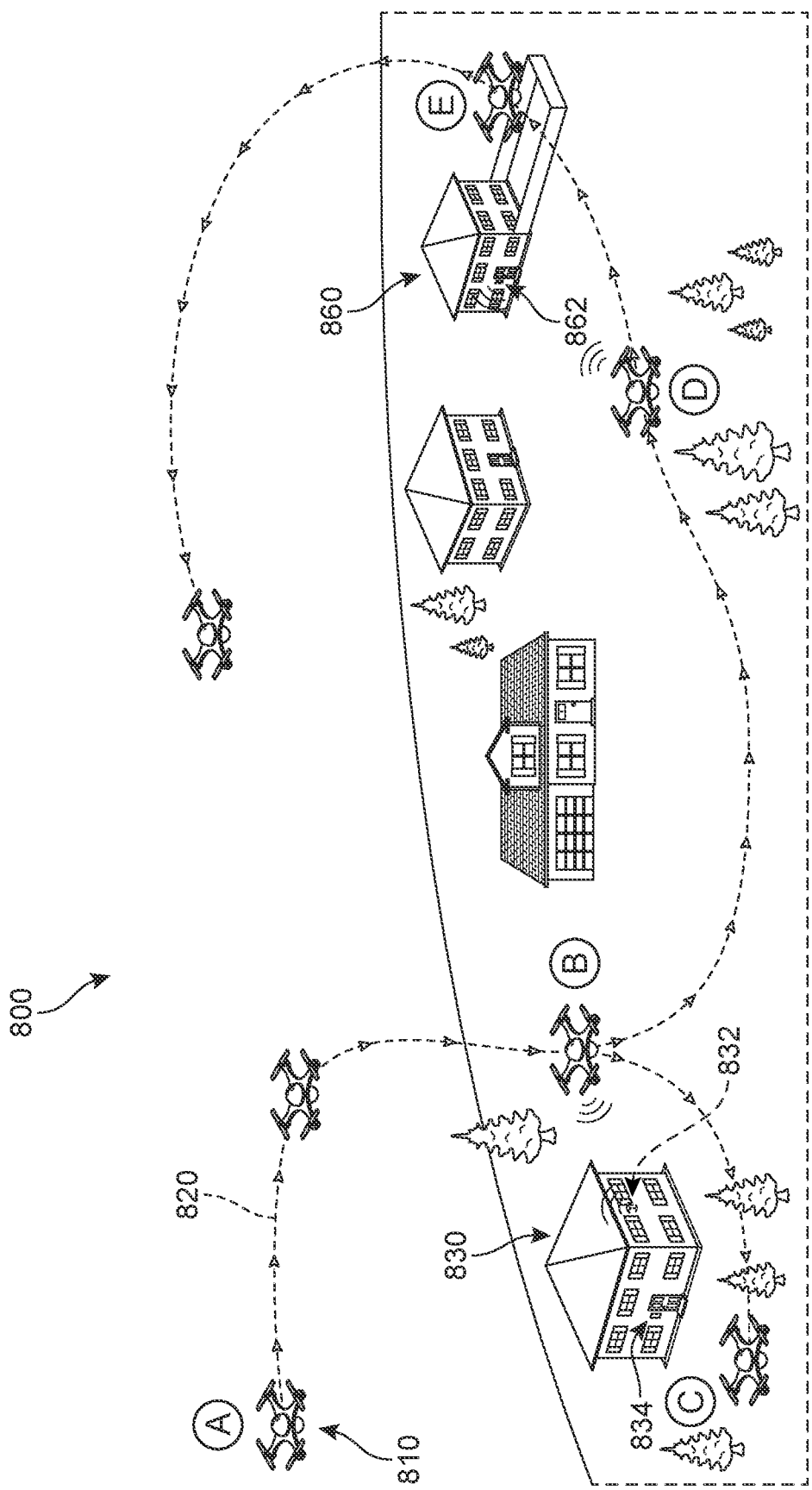
FIG. 8 is an example of a UAV performing multiple deliveries at homes with individual navigation computing devices, according to an embodiment.

In FIG. 8, a first UAV 810 travels to a neighborhood 800, shown initially at a position "A". The first UAV 810 continues traveling along a path 820 until reaching its first macro-location waypoint "B", near a first structure 830. At this time, a first smart navigation device ("first smart device") 832, installed on a side of the house by a window, verifies whether the first UAV 810 is to be permitted access to its navigational database. Once verified, the first smart device 832 transmits a LOS signal to the first UAV 810 to guide the vehicle from the location "B" toward the back of the house. Upon reaching the corner of the first structure 830, a second smart device 834, installed next to the back door of the house, performs similar verification steps and communicates instructions for navigation via an LOS signal to the final micro-destination "C" near the back door of the first structure 832. Thus, despite being out of the line of sight of the first smart device 832, the guidance continues with a switchover to the second smart device 834 which comes into the line of sight of the UAV after it moves toward the back of the house. The instructions allow the UAV to navigate around the structure as well as nearby trees that might otherwise pose a danger to the UAV. In some embodiments, after delivery, the second smart device 834 and first smart device 832 guide the first UAV 810 back to waypoint "B". In other embodiments, the first UAV 810 simply reverses the course that it traveled to return to "B".

The first UAV 810 in this case has a second delivery in the same neighborhood 800, and so continues along the path 820 toward a second structure 860, avoiding other structures in the area as well as a patch of forest. Upon reaching a second macro-location waypoint "D", near the second structure 860, a third smart device 862, installed at a front door of the house by a window, verifies whether the first UAV 810 is to be permitted access to its navigational database. Once verified, the third smart device 862 transmits an NLOS signal to the first UAV 810 to guide the vehicle from the location "D" toward a fenced-in side yard of the house corresponding to a micro-destination "E", where the delivery is performed. The signal from the third smart device 862 precisely guides the UAV over the fence and into the yard (out of direct sight of the smart device) and then to a safe, expedient exit route above.

Figure 9:
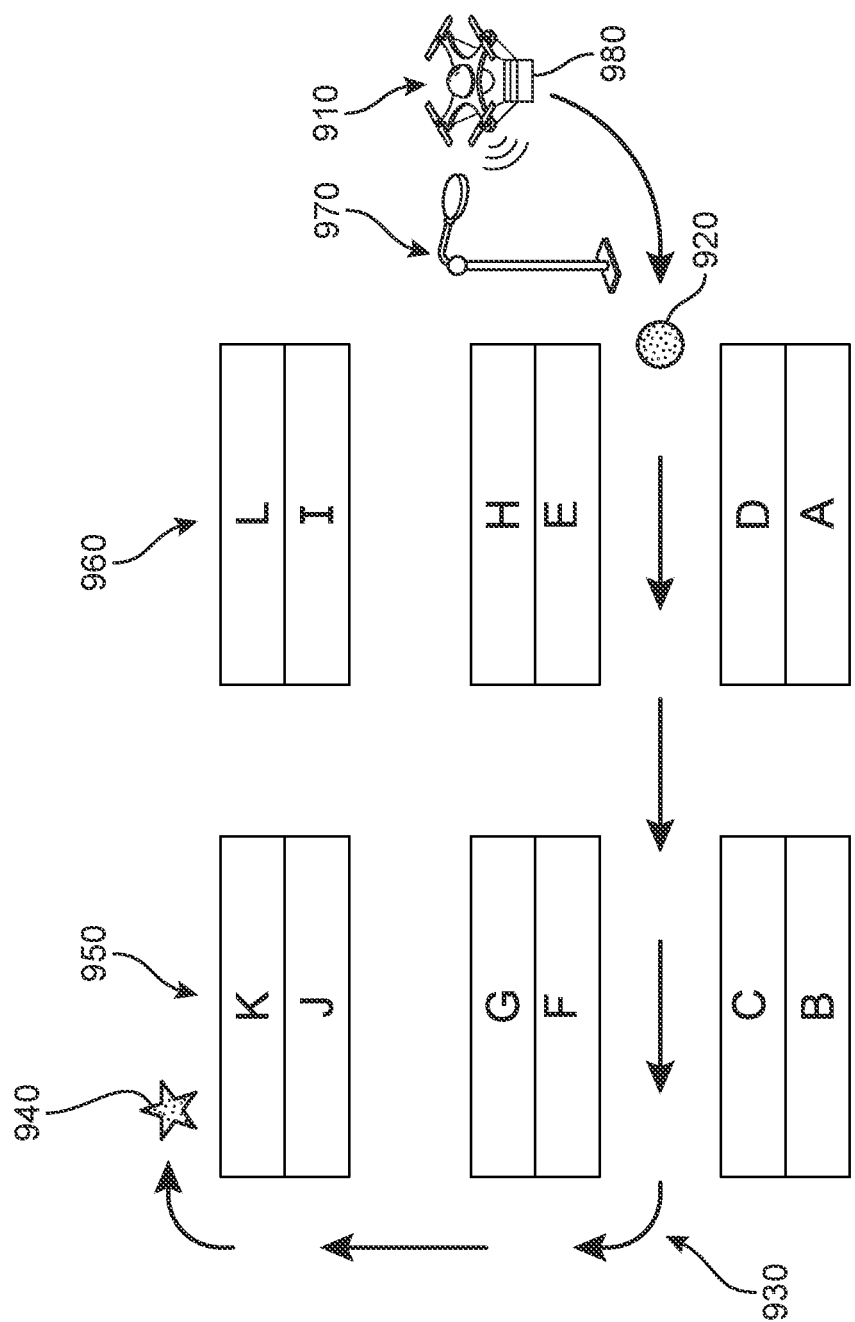
FIG. 9 is an example of a UAV performing a delivery at a condominium complex with reference to a central navigation computing device, according to an embodiment.

FIG. 9 is an example of a large building complex 950 comprising multiple condominiums 960, with the complex sharing a single, central navigation device ("central device") 970 stationed toward a front of the complex 950. In other words, in some embodiments, the managers for a complex or other shared-residential or commercial structure can install a "community use" navigation device around the property in order to provide the 'last-mile' delivery services described herein to its community of residents. In this example, condos A-L are schematically depicted. A second UAV 910 arrives at the complex 950 with a package 980 to be delivered to a recipient in condo "K". The second UAV 910 communicates with the central device 970 for verification and then receives precise navigation instructions to move from the initial macro-destination near the central device 970 along a series of micro-waypoints 920 until safely reaching condo "K" and a target micro-destination 940 directly at the entrance to the condo. It can be appreciated that such a dynamically responsive system can greatly increase the ease of delivery—rather than drop off the package at a main office or community dropbox, requiring the recipient to leave their home, the central device 970 enables packages to be directly conveyed to the specific recipient's desired site.

Figure 10:
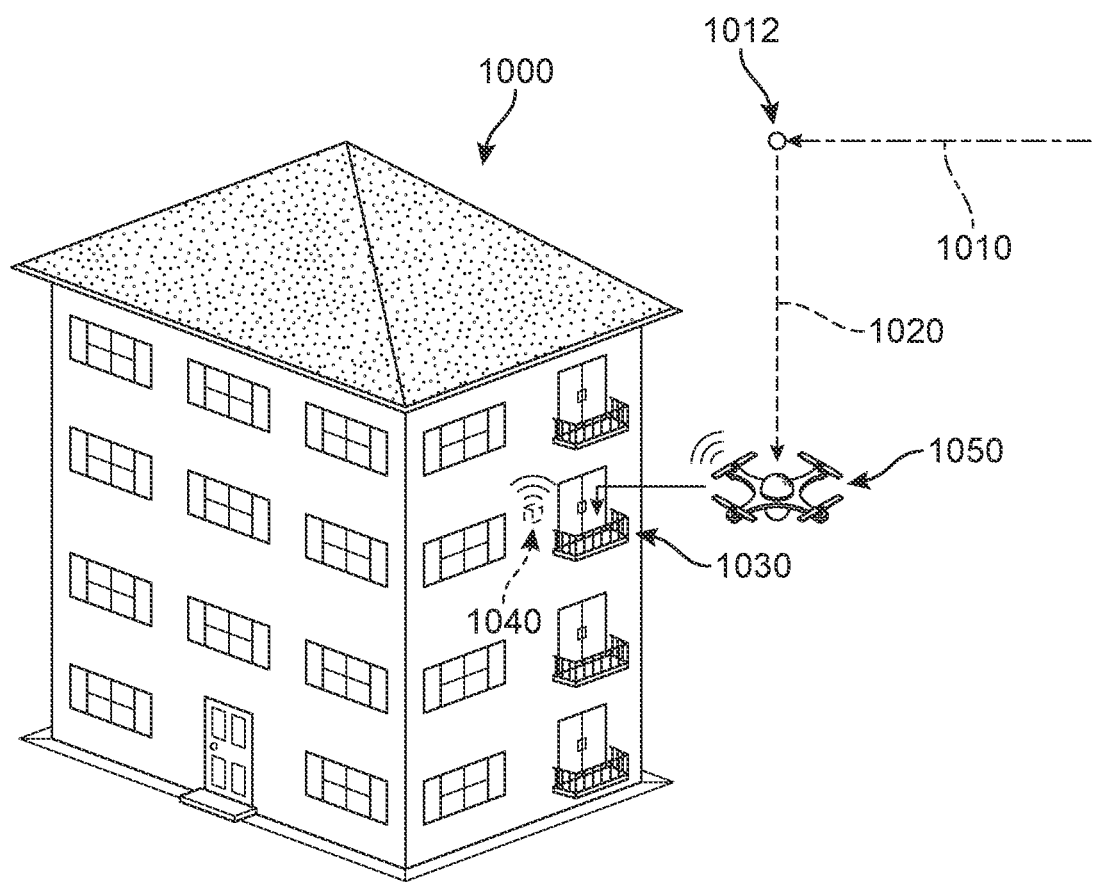
FIG. 10 is an example of a UAV performing a delivery to a specific apartment at an apartment building, according to an embodiment.

FIG. 10 is an example of a large apartment building 1000 comprising multiple apartments, with a first apartment dwelling having installed a fourth navigation smart device ("fourth smart device") 1040 directly along their balcony 1030. As a third UAV 1050 approaches building macro-destination 1012 via a GPS or GNSS-enabled path 1010, a handshake occurs, and the UAV is recognized and verified by the fourth smart device 1040. The fourth smart device 1040 then transmits a signal to the third UAV 1050 that directs the UAV along a local path 1020 that leads directly to the balcony 1030, while avoiding nearby obstacles—including adjacent balconies. The UAV drops its package and returns to airspace by reversing along the same local path 1020.

Figure 11:
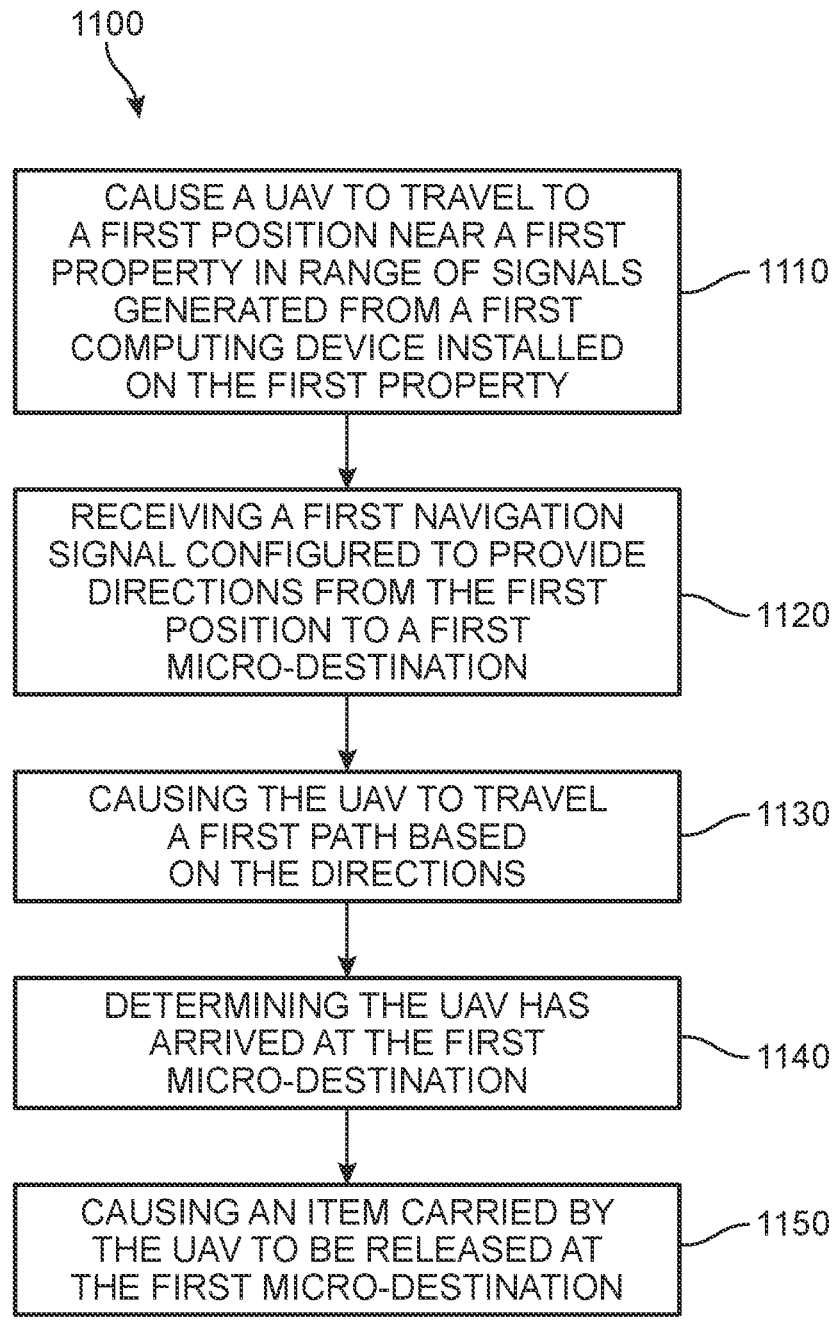
FIG. 11 a flow chart depicting a process of guiding a UAV to a micro-destination for high-precision delivery of items, according to an embodiment.

FIG. 11 is a flow chart illustrating an embodiment of a method 1100 of guiding an unmanned aerial vehicle (UAV) to a micro-destination for high-precision delivery of items. A first step 1110 includes causing, via an onboard computing device for the UAV, the UAV to travel to a first position near a first property, the first position being in range of signals generated from a first (navigation) computing device installed on the first property. A second step 1120 includes receiving, from a first computing device and at the onboard computing system, a first navigation signal that is configured to provide directions from the first position to a first micro-destination corresponding to a specific portion of the first property. In addition, a third step 1130 includes causing, via the onboard computing system and in response to receiving the first navigation signal, the UAV to travel a first path based on the directions, and a fourth step 1140 includes determining, at the onboard computing system, that the UAV has arrived at the first micro-destination. Furthermore, a fifth step 1150 includes causing (in response to the determination that the UAV has arrived at the first micro-destination), via the onboard computing system, an item carried by the UAV to be released at the first micro-destination.

In different embodiments, the method 1100 may include additional steps or aspects. In one embodiment, the method 1100 also includes a step of receiving, at the onboard computing system and from the first computing device, a request for identification prior to receiving the first navigation signal, and transmitting, from the onboard computing device and to the first computing device, identification data for the UAV. In another example, the method 1100 further includes steps of receiving, at the first computing device, the identification data, determining, at the first computing device and with reference to a scheduled deliveries knowledge repository, that the identification data corresponds to a UAV scheduled to perform a delivery to the property, and generating the first navigation signal in response to determining the UAV is scheduled to perform a delivery. In some embodiments, the first computing device is an IoT device mounted on an external surface of a building situated on the property, and in another embodiment the first computing device is a smart doorbell.

In some examples, the method 1100 further includes a step of causing, via the onboard computing system, the UAV to travel a second path back to the first position once the item is released, the second path being a reversal of the first path. In another example, the method 1100 can also include steps of receiving, from the first computing device and at the onboard computing system for the UAV, a second navigation signal that is configured to provide directions to the UAV from the first micro-destination to a second position, and causing, in response to receiving the second navigation signal, the UAV to travel a second path based on the directions that returns the UAV to general airspace.

In one embodiment, the first navigation signal is a light-based signal that is aimed at the first micro-destination, and in another embodiment, the first navigation signal is an RF-based signal. In some embodiments, the first navigation signal is one of a QR code and an RFID tag presented via the first computing device. In another example, the first micro-destination is outside of a line of sight of the first computing device, and in another example, the first micro-destination is in a line of sight of the first computing device.

Other methods may be contemplated within the scope of the present disclosure. For example, in some embodiments, a method of guiding an unmanned aerial vehicle (UAV) to a micro-destination for high-precision delivery of items is disclosed. The method includes a first step of receiving, at a first (navigation) computing device installed at a first property, coordinates for a first micro-destination and a second step of receiving, at the first computing device, identification data for a UAV located at a first position in proximity to the first computing device. A third step includes verifying, at the first computing device and with reference to a delivery knowledge repository, the UAV as corresponding to a first expected delivery. In addition, a fourth step includes generating, via a signal emitter of the first computing device, a navigation signal configured to direct the UAV from the first position to the first micro-destination, and a fifth step includes updating the delivery knowledge repository to indicate arrival of the UAV for the first expected delivery.

In other embodiments, this method may include additional steps or aspects. In one embodiment, the method includes further steps of transmitting, from the first computing device and to the UAV, a handshake signal, and establishing a connection between the first computing device and the UAV following the handshake signal. In one embodiment, the method also includes a step of detecting, at the first computing device, one or more external signals indicating the presence of the UAV near the first computing device before transmitting the handshake signal.

In some embodiments, the first computing device is an IoT device mounted on an external surface of a building situated on the property. In one example, the first computing device is a smart doorbell. In another embodiment, the first navigation signal is a light-based signal that is aimed at the first micro-destination, and in another embodiment, the first navigation signal is an RF-based signal. In some embodiments, the first navigation signal is one of a QR code and an RFID tag presented via the first computing device. In another example, the first micro-destination is outside of a line of sight of the first computing device, and in yet another example, the first micro-destination is in a line of sight of the first computing device.

Light, RF, or other types of signals generated applying one or more of the techniques disclosed herein may be produced by a light emitter, radio emitter or other output device. In some embodiments, the output device may be coupled directly to the system or processor generating the signal. In other embodiments, the output device may be coupled indirectly to the system or processor such as via a network. Examples of such networks include the Internet, mobile telecommunications networks, a WIFI network, as well as any other wired and/or wireless networking system. When the output device is indirectly coupled, the signal generated by the system or processor may be recorded over the network to the server or other computing device. Such records allow applications and other software which track, monitor, or otherwise manage drone deliveries to receive pertinent data.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, smart watches, smart glasses, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A method of guiding an unmanned aerial vehicle (UAV) to a micro-destination for high-precision delivery of items, the method comprising:
   receiving, at a first local computing device installed on a property and from a mobile computing device associated with a user, a set of multiple potential delivery site micro-destinations located throughout the property;
   causing, via an onboard computing system of the UAV, the UAV to travel to a first position near the property, the first position being in range of signals generated from the first local computing device installed on the property and remote from the UAV;
   receiving, at the first local computing device, identification data for the UAV;
   determining, at the first local computing device and with reference to a scheduled deliveries knowledge repository, that the identification data corresponds to a UAV scheduled to perform a delivery to the property;
   receiving, at the first local computing device and from the mobile computing device associated with the user, a user selection of a delivery site micro-destination from the set of multiple potential delivery site micro-destinations, the delivery site micro-destination corresponding to a specific portion of the property where the user intends for a delivery from the UAV to be received;
   generating a first navigation signal in response to determining the UAV is scheduled to perform a delivery;
   receiving, from the first local computing device and at the onboard computing system, the first navigation signal that is configured to provide first directions from the first position to a first micro-destination;
   causing, via the onboard computing system and in response to receiving the first navigation signal, the UAV to travel a first path based on the first directions from the first position to the first micro-destination;
   determining, at the onboard computing system, that the UAV has arrived at the first micro-destination;
   receiving, at the onboard computing system, a second navigation signal from a second local computing device installed at the property in a location that is out of a line of sight of the first local computing device but within a line of sight of the first micro-destination, the second navigation signal configured to direct the UAV from the first micro-destination to the delivery site micro-destination;
   causing, via the onboard computing system and in response to receiving the second navigation signal, the UAV to travel a second path based on the second directions from the first micro-destination to the delivery site micro-destination; and
   causing, via the onboard computing system, an item carried by the UAV to be released at the delivery site micro-destination.

2. The method of claim 1, further comprising:
   wherein the step of receiving a user selection of the delivery site micro-destination from the set of multiple potential delivery site micro-destinations occurs after the user has scheduled a delivery and before the UAV has travelled to a first position near the property.

3. The method of claim 2, further comprising:
   detecting, at the first local computing device, one or more external signals indicating the presence of the UAV near the first local computing device; and
   causing a signal emitter of the first local computing device to generate a handshake signal in response to detection of the UAV, where the handshake signal requests a connection between the first local computing device and the UAV to initiate an authentication with the request for identification data from the UAV.

4. The method of claim 1, wherein the first local computing device is an IoT device mounted on an external surface of a building situated on the property.

5. The method of claim 4, wherein the first local computing device is a smart doorbell.

6. The method of claim 1, further comprising causing, via the onboard computing system, the UAV to travel a second path back to the first position once the item is released, the second path being a reversal of the first path.

7. The method of claim 1, further comprising:
   receiving, from the first local computing device and at the onboard computing system for the UAV, a return navigation signal that is configured to provide directions to the UAV from the delivery site micro-destination to a second position; and
   causing, in response to receiving the return navigation signal, the UAV to travel a third path based on the directions that returns the UAV to general airspace.

8. The method of claim 1, wherein the first navigation signal is a light-based signal that is aimed at the first micro-destination.

9. The method of claim 1, wherein the first navigation signal is an RF-based signal.

10. The method of claim 1, wherein the first navigation signal is one of a QR code and an RFID tag presented via of the first local computing device.

11. The method of claim 10, wherein the first micro-destination is outside of a line of sight of the first local computing device.

12. The method of claim 1, wherein the first micro-destination is in a line of sight of the first local computing device.

13. A method of guiding an unmanned aerial vehicle (UAV) to a micro-destination for high-precision delivery of items, the method comprising:
   receiving, at a first computing device installed at a first property and remote from the UAV, coordinates for a first micro-destination;
   receiving, at the first computing device, identification data for a UAV located at a first position in proximity to the first computing device;
   verifying, at the first computing device and with reference to a scheduled delivery knowledge repository, that the identification data corresponds to the UAV scheduled to perform a first expected delivery to the first property;
   generating, via a signal emitter of the first computing device, a first navigation signal configured to direct the UAV from the first position to the first micro-destination in response to verifying that the UAV is scheduled to perform the first expected delivery to the first property;

receiving, at the UAV, a second navigation signal from a second computing device installed at the first property in a location that is out of a line of sight of the first computing device but within a line of sight of the first micro-destination, the second navigation signal configured to direct the UAV from the first micro-destination to a second micro-destination where a delivery takes place; and updating the scheduled delivery knowledge repository to indicate arrival of the UAV for the first expected delivery.

14. The method of claim 13, further comprising:
transmitting, from the first computing device and to the UAV, a handshake signal; and
establishing a connection between the first computing device and the UAV following the handshake signal.

15. The method of claim 14, further comprising detecting, at the first computing device, one or more external signals indicating the presence of the UAV near the first computing device before transmitting the handshake signal.

16. A system for guiding an unmanned aerial vehicle (UAV) to a micro-destination for high-precision delivery of items, the system comprising a processor and machine-readable media including instructions which, when executed by the processor, cause the processor to:

receive, at a first local computing device installed on a property and from a mobile computing device associated with a user, a set of multiple potential delivery site micro-destinations located throughout the property;

cause, via an onboard computing system, the UAV to travel to a first position near the property, the first position being in range of signals generated from the first local computing device installed on the property and remote from the UAV;

receive, at the first local computing device, identification data for the UAV;

determine, at the first local computing device and with reference to a scheduled deliveries knowledge repository, that the identification data corresponds to a UAV scheduled to perform a delivery to the property;

receiving, at the first local computing device and from the mobile computing device associated with the user, a user selection of a delivery site micro-destination from the set of multiple potential delivery site micro-destinations, the delivery site micro-destination corresponding to a specific portion of the property where the user intends for a delivery from the UAV to be received;

generate a first navigation signal in response to determining the UAV is scheduled to perform a delivery;

receive, from the first local computing device and at the onboard computing system, the first navigation signal that is configured to provide directions from the first position to a first micro-destination;

cause, via the onboard computing system and in response to receiving the first navigation signal, the UAV to travel a first path based on the directions from the first position to the first micro-destination;

determine, at the onboard computing system, that the UAV has arrived at the first micro-destination;

receiving, at the onboard computing system, a second navigation signal from a second local computing device installed at the property in a location that is out of a line of sight of the first local computing device but within a line of sight of the first micro-destination, the second navigation signal configured to direct the UAV from the first micro-destination to the delivery site micro-destination;

causing, via the onboard computing system and in response to receiving the second navigation signal, the UAV to travel a second path based on the second directions from the first micro-destination to the delivery micro-destination; and cause, via the onboard computing system, an item carried by the UAV to be released at the delivery site micro-destination.

17. The system of claim 16, wherein the instructions further cause the processor to:
receive, at the onboard computing system and from the first local computing device, a request for identification prior to receiving the first navigation signal; and
transmit, from the onboard computing system and to the first local computing device, identification data for the UAV.

18. The system of claim 17, wherein the instructions further cause the processor to:
detecting, at the first local computing device, one or more external signals indicating the presence of the UAV near the first local computing device; and
cause a signal emitter of the first local computing device to generate a handshake signal in response to detection of the UAV, where the handshake signal requests a connection between the first local computing device and the UAV to initiate an authentication with the request for identification data from the UAV.

19. The system of claim 16, wherein the first local computing device is an IoT device mounted on an external surface of a building situated on the property.

20. The system of claim 16, wherein the first navigation signal is one of an RF-based signal, a light-based signal, a QR code, and an RFID tag.

* * * * *